April 12, 1927.
T. E. MURRAY
WHEEL AND BRAKE DRUM
Filed March 11, 1924
1,624,112
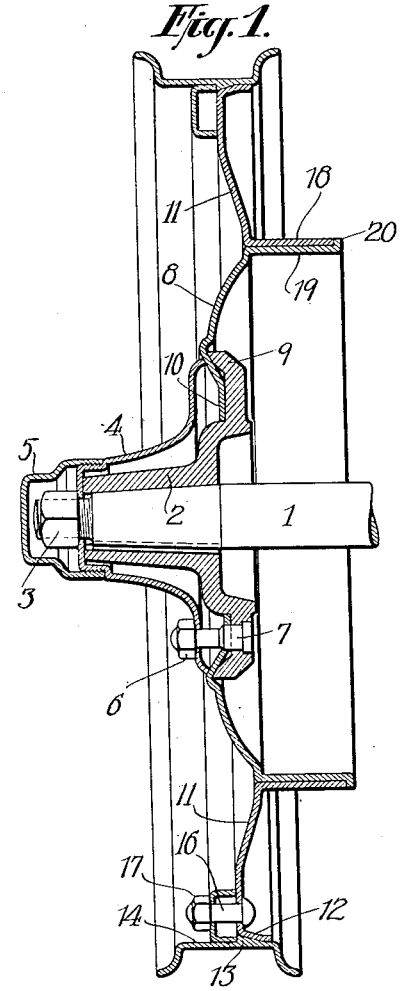
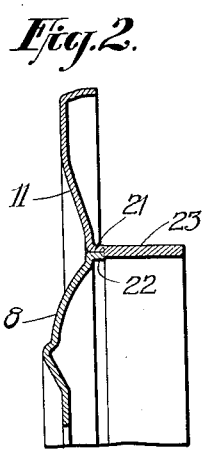
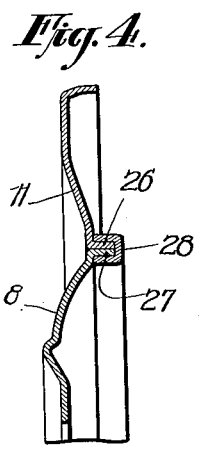
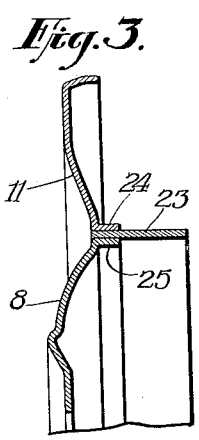
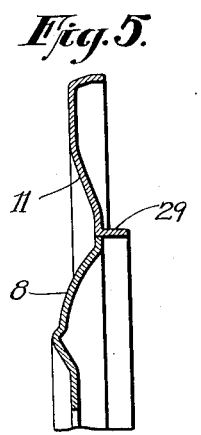
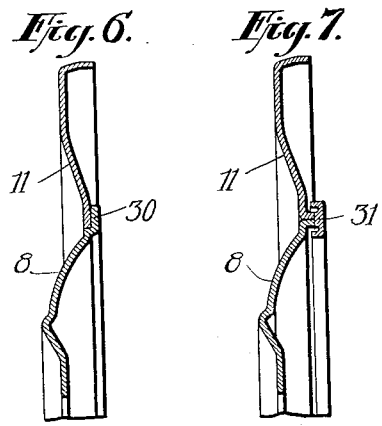
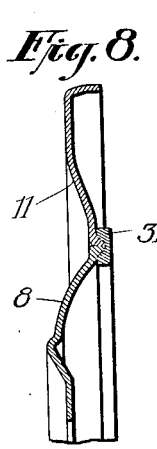
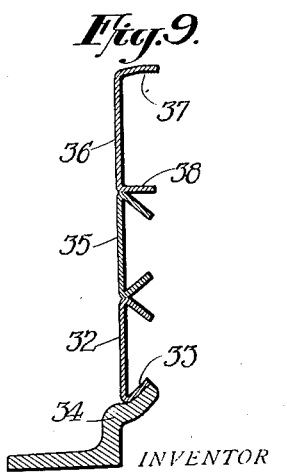
INVENTOR
Thomas E Murray
BY
ATTORNEY Patented Apr. 12, 1927.

1,624,112

UNITED STATES PATENT OFFICE.

THOMAS E. MURRAY, OF BROOKLYN, NEW YORK.

WHEEL AND BRAKE DRUM.

Application filed March 11, 1924. Serial No. 698,400.

My invention aims to provide certain improvements chiefly in the direction of lightness and economy in metal wheels for vehicles and in brake drums therefor.

The accompanying drawings illustrate embodiments of the invention.

Figure 1 is a diametral section of a complete wheel with brake drum;

Figs. 2 and 3 are partial sections of modifications thereof;

Figs. 4 to 9 inclusive are partial sections of wheels without the brake drum.

Referring to Fig. 1, the shaft 1 carries a hub 2 fastened on its end by means of a nut 3. An approximately cone-shaped member 4 is fastened on the end of the hub by the same nut 3, the outer end being covered by a cap 5.

The inner edge of the disc of the wheel is pinched between flanges of the hub 2 and the clamping member 4 by means of nuts 6 on bolts 7 passing through the hub, the disc, and the clamping member.

The disc may be variously bent and curved in radial section.

I propose to make it of two or more annular members stamped from sheet metal, whereby considerable economy of metal is effected as compared with a one-piece disc.

In Fig. 1 there is an inner annulus 8 which is recessed on its inner side to fit over the projecting flange 9 of the hub. Its inner edge 10 is centered on the hub. There is also an outer annulus 11 forming a continuation of the inner annulus and having at its outer edge a flange 12 which tapers toward the outer side of the wheel and is engaged by a similarly tapered portion 13 of a demountable rim 14.

The rim has also on its inside a shoulder for engagement by a fastening ring 15 which is channel-shaped in cross-section with one flange bearing against the shoulder of the demountable rim and the other against the outer face of the disc. Bolts 16 pass through the disc and the fastening ring and carry nuts 17 by which the outer flange of the ring may be drawn inward to force the demountable rim 14 on to the flange 12 of the disc.

Such a two-part disc furnishes a very convenient and inexpensive method of providing a brake drum at the line of junction of the two parts of the disc. Such a drum may be formed as a flange on either part of the disc or may be a separate member applied thereto. In Fig. 1 a complete drum is formed of two such flanges. A flange 18 on the member 11 embraces a flange 19 on the member 8, the latter having its edge 20 again flanged outward over the edge of the drum 18. The parts may be fastened together by welding at the exposed edges of the joint or by spot welding or riveting, and in various other ways.

In the modification shown in Fig. 2 the parts of the disc have short flanges 21 and 22 by which they are united. The brake drum 23 is a reactangular strip which can be economically stamped from a sheet and bent around to drum form. It is then butt welded on to the edges of the flanges 21 and 22.

Such a drum 23 may also be applied by passing its inner edge between flanges 24 and 25 of the two parts of the disc, as in Fig. 3, and fastened by welding or riveting or both.

According to Fig. 4 the two parts of the disc are provided with flanges 26 and 27 which are held together by a ring 28 of channel-shape in cross-section with its flanges overlying the flanges 26 and 27; the parts being united by welding or riveting as explained above. A brake drum may be applied to the ring 28 in any one of various ways.

According to Fig. 5 only one of the parts of the disc is flanged. The flange may be on either part but is illustrated at 29 as formed on the outer part 11. The two parts are welded together at their junction. A brake drum may be applied to the edge of the flange 29, or it may be made to fit over the outside of the latter, or to fit within it. The same thing is true for the projections on the inner face of the wheel shown in the other figures of the drawing.

Fig. 6 shows the provision of an overlapping flange on one of the parts. The part 8 in this case has an edge portion or flange 30 overlying the inner face of the part 11 whereby they may be riveted together as well as welded.

Fig. 7 shows the two parts provided with flanges which are united by a special form of welding ring 31 having a raised rib at the center and flanges at the edges. When the parts are pressed together in the axial direction and a strong welding current passed they will be softened at the contacting points and will flow so as to fill the spaces and present a substantially solid construction as indicated in Fig. 8.

Fig. 9 illustrates the making of the disc of three parts. A central annulus 32 has a flange 33 on its inner edge engaging a suitably shaped face on the hub 34. A second annulus 35 engages the outer edge of the first; and a third annular part 36, the outer edge of the second. Each of these is formed with flanges on the inner side. They may be stamped in annular shape from sheet metal, or they may be formed of channels originally straight and bent to annular form. The flanges are preferably bent inward as illustrated to provide comparatively sharp lines of contact which can be better welded than broad surfaces. The outermost flange 37 however, is shaped to fit the rim; and preferably the flange 38 which is intended for the support of the brake drum, is parallel to the axle. The radial section of the wheel may be straight as indicated in Fig. 9, the flanges at the back giving the necessary stiffness, or they may be shaped to the section shown in Fig. 1 or, indeed, to practically any other section desired.

In all the constructions illustrated one or more of the annular parts of the disc may be made of segments joined together at their ends by welding or otherwise.

Though I have described with great particularity of detail certain embodiments of my invention, yet it is not to be understood therefrom that the invention is restricted to the particular embodiments disclosed. Various modifications thereof may be made by those skilled in the art without departure from the invention as defined in the following claims.

What I claim is:

1. A vehicle wheel comprising a metal disc formed of a plurality of annular parts, the outer edge of one joined to the inner edge of the next and a third member united directly to each of said annular parts at the joint between them.

2. A vehicle wheel comprising a metal disc formed of a plurality of annular parts, the outer edge of one joined to the inner edge of the next and a third member welded directly to each of said annular parts to form the said joint between them.

3. A vehicle wheel comprising a metal disc formed of a plurality of annular parts, the outer edge of one joined to the inner edge of the next and a third member of drum shape united directly to each of said annular parts at the joint between them.

4. A vehicle wheel comprising a metal disc formed of a plurality of annular parts, the outer edge of one joined to the inner edge of the next and a brake drum comprising a bent strip of sheet metal united directly to each of said annular parts at the joint between them.

5. A vehicle wheel comprising a metal disc formed of a plurality of annular parts, the outer edge of one joined to the inner edge of the next and having an axial projection at the joint and a brake drum united directly to each of said parts at said joint.

6. A vehicle wheel comprising a metal disc formed of a plurality of annular parts, the outer edge of one joined to the inner edge of the next and having an axial projection at the joint and a brake drum comprising a bent strip of sheet metal welded at its edge to said projection.

7. A vehicle wheel comprising a metal disc formed of a plurality of annular parts, the outer edge of an inner part and the inner edge of the next outer part having adjacent flanges and a third member welded to the edges of said flanges.

8. A vehicle wheel comprising a metal disc formed of a plurality of annular parts, the outer edge of an inner part and the inner edge of the next outer part having adjacent flanges and a third member of drum shape welded to the edges of said flanges.

In witness whereof, I have hereunto signed my name.

THOMAS E. MURRAY.